ENDLESS RELAY CHAIN

Original Filed April 18, 1960 7 Sheets-Sheet 1

Sept. 21, 1965 R. H. DUNCAN ETAL 3,207,852

ENDLESS RELAY CHAIN

Original Filed April 18, 1960 7 Sheets-Sheet 2

Sept. 21, 1965 R. H. DUNCAN ETAL 3,207,852

ENDLESS RELAY CHAIN

Original Filed April 18, 1960 7 Sheets-Sheet 3

ENDLESS RELAY CHAIN

Original Filed April 18, 1960 7 Sheets-Sheet 4

ENDLESS RELAY CHAIN

Original Filed April 18, 1960

ENDLESS RELAY CHAIN

Original Filed April 18, 1960 7 Sheets-Sheet 6

Sept. 21, 1965 R. H. DUNCAN ETAL 3,207,852

ENDLESS RELAY CHAIN

Original Filed April 18, 1960 7 Sheets-Sheet 7

3,207,852

ENDLESS RELAY CHAIN

Robert Hudson Duncan, Arlington Heights, and Thomas Paul Miller, Mount Prospect, Ill., assignors to International Telephone and Telegraph Corporation, New York, N.Y., a corporation of Maryland Original application Apr. 18, 1960, Ser. No. 23,086, now Patent No. 3,176,081, dated Mar. 30, 1965. Divided and this application Sept. 8, 1964, Ser. No. 395,085

8 Claims. (Cl. 179—18)

This invention relates to telephone systems and more particularly to endless relays for use in such systems. It is a division of a copending application entitled, "Cordless Switchboard," Serial No. 23,086 filed by the inventors herein on April 18, 1960, which issued as U.S. Patent No. 3,176,081 on March 30, 1965 and assigned to the assignee of this application.

Telephone systems incorporate many different types of equipment for interconnecting telephonic lines, there being both automatic equipment which is controlled by subscriber transmitted switching signals and manual equipment which is controlled by an operator. In both the automatic and manual systems, it is very often necessary to interconnect common control equipment and selected individual equipment as, for example, when finding equipment is preassigned to serve the next call or when idle links are seized by an operator to complete a call. Circuits for so interconnecting common and individual equipment are sometimes called "allotters" or "distributors." Since almost no call may be completed without having access to common equipment, it is obvious that allotters are critically situated—if an allotter fails, substantially all of the telephone system that is served thereby fails. If, by way of contrast, a line is faulty, usually only that line and perhaps one or two switching components are put out of action. Similarly, if common central office equipment fails, there are usually other devices which take over and complete a switching function.

Turning next to problems encountered in manual and semi-manual telephone systems, it is not only necessary to provide the allotter described above for interconnecting individual and common equipments, but it is also necessary to provide an operator with means for utilizing the common equipment to interconnect selected individual equipments. For example, a conventional telephone switchboard includes cord circuits (common equipment) which may be utilized by an operator to interconnect individual subscriber lines as by using plug terminated cords. In such systems, the cords are sometimes difficult to handle, unsightly as when used by a receptionist, and occasionally a source of trouble. Therefore, attempts have been made to eliminate the cords by providing what is termed a "cordless switchboard" where an operator seizes automatically controlled switches or "links" which are used to interconnect the subscriber lines in lieu of plug terminated cords.

Although cordless switchboards have been available for a long period of time, they have not generally replaced the cord type switchboard, probably because the cordless type have been large complicated devices. For an example of how cumbersome cordless switchboards have been, consider the number of keys which are usually provided. It has been necessary to provide an individual key for each subscriber line in each of the switching links. Therefore, a system having a hundred lines and 20 links has required either two thousand single acting keys or one thousand double acting keys resulting in switchboards beyond the anthropometical capacities of the average operator. There are, of course, other complications which have also hindered the development of cordless switchboards, such as a need for better allotters, for example.

Therefore, an object of this invention is to provide new and improved cordless switchboards, especially although not entirely for use in connection with cross-bar switching link equipment, and improved allotters which continue to function despite an occurrence of a fault condition therein.

A further object of this invention is to provide for sequentially connecting individual circuits to common circuits in either of two orders with the order being selected to minimize the effects of fault conditions.

Still another object of this invention is to establish calls through switching equipment to idle circuits only, while allowing operators to seize busy circuits through the same switching equipment.

A still further object of this invention is to provide a cordless switchboard having a minimum number of keys for controlling the interconnection of selected circuits.

In accordance with this invention, a cordless switchboard is associated with plurality of link circuits, each having an individual conductor for controlling access thereto. An allotter is adapted sequentially to interconnect groups of these individual conductors with common control conductors having busy test and select relays attached thereto. Therefore, signals appearing on the individual conductors are applied over the common conductors to cause either the selection of an idle link or the operation of the busy relays. To cut in on a busy link, an operator overrides these signals and by simultaneous operation of link and line keys energizes a proper select relay. When the allotter encounters faulty equipment, it reverses the order in which the individual conductors are connected to the common conductors, thereby avoiding such faulty equipment.

The above mentioned and other objects of this invention together with the manner of obtaining them will become more apparent and the invention itself will be best understood by making reference to the following description of an embodiment of the invention taken in conjunction with the accompanying drawings in which:

FIG. 1 shows a cordless switchboard by means of a block diagram;

FIGS. 2–7 schematically show the details of the circuit which is used to complete the "automatic link selector" that is depicted by a heavily inked box in FIG. 1; and FIG. 8 shows the manner in which FIGS. 2–7 should be assembled to provide a complete and understandable circuit.

Where possible, simple terms are used and specific items are described hereinafter to facilitate an understanding of the invention; however, it should be understood that the use of such terms and references to such items are not to act in any manner as a disclaimer of the full range of equivalents which is normally given under established rules of patent law. For example, the automatic link selector is shown as being used in connection with cross-bar switches; however, it should be understood that any well known switching equipment may be used. Moreover, the allotter is shown as used in connection with a cordless switchboard; whereas, it may be used anytime that a distributor function is required. Quite obviously, many other examples could be selected to illustrate why a full range of equivalents should be allowed.

*Brief description*

Turning next to FIG. 1, there is shown by block diagram that portion of a telephone system which is necessary for an understanding of how the invention operates. More particularly, near the upper center of FIG. 1, there are shown a plurality of telephonic lines 10 which may include both subscriber lines and trunk lines. In addition, any other telephonic lines, such as those leading to an operator position, for example, may also have an appearance in group 10. As shown, each line includes two talking conductors "T" and "R" and a single sleeve or control conductor "S"; although, it is within the scope of this invention for each line to include four or more talking conductors and to provide two or more control conductors or one control conductor per operator position as required by any particular telephone system. Moreover, any suitable line, trunk, or associated circuits may be provided, as required.

Also shown in FIG. 1 are operator position 11, automatic link selector 12, and two cross-bar switches 13 and 14 together with their control circuits 50 and 51. Each of the telephonic lines 10 is connected to an individually associated one of first multiples in the cross-bar switches and the operator is selectively connected by selector 12 to any of the second multiples in such switches via conductors **21*a*–21*n*. To increase the capacity of the cordless switchboard, any number of cross-bar switches may be connected horizontally in tandem as indicated by the dashed lines 23, each of the second multiples being interconnected as indicated at 23*a*. For convenience of reference these second multiples are hereinafter called "links." For example, operator position 11 may be connected via conductors 21*a* to line 20*a* when cross-point 22 in the first link operates or connected to line 20*n* when cross-point 27** (also in the first link) operates.

In addition, each of the links may also be connected to suitable special service apparatus 30 in any suitable manner such as by connecting special service trunks to cross-bar switch verticals which may include any equipment that is required during any particular call. For example, if a group of lines are to be interconnected in a conference call circuit, suitable amplifier equipment may be included in the box 30. Or, if conversation timing equipment is provided, it may be included in box 30.

To provide for extra operators, any number of cross-bar switches and associated automatic link selector may be duplicated as indicated by the bracket 40. To illustrate, if five operator positions are required, four additional automatic link selectors 42–45 have access to cross-bar switches 46–49 which are arranged vertically beneath each of the switches 13 and 14. The four additional cross-bar switches are connected on the left to automatic link selectors 42–45, on the right to special service apparatus 31–34, and multipled vertically between lines 10 and controllers 50 and 51.

To provide the control and supervisory functions that are required to operate the cross-bar switches, controllers 50 and 51 are connected as shown. Attached to and functioning with each of the controllers is any necessary common equipment such as that illustrated generally by card reader 52. A card reader is a device which accepts perforated cards and reads-out information punched therein. For example, if it should be necessary to call a group of people such as a group of volunteer firemen, for example, it is only necessary to insert a proper perforated card in reader 52 whereupon all necessary cross-points are operated.

Next, attention is directed to the manner in which the automatic link selector 12 operates. The automatic link selector is interposed between the operator position 11 and links in the associated cross-bar switches as indicated by conductors **21*a*–21*n*. Hence, selector 12 may test the sleeve conductors associated with conductors 21*a*–21*n* and select the first available link. Also, each of the subscriber lines has an appearance for control purposes in selector 12 as indicated at 28. The important thing to note at this time, is that the operator at position 11 has only to operate selector 12 whereupon a seizure signal is transmitted to the first idle link in cross-bar switches 13 and 14. If a subscriber line is in a calling condition, there is a coincidence of seizure signals at an associated cross-point which operates. To cut-in on a busy line, the operator has only to operate a line key having a control association with such line, as indicated at 28, and simultaneously therewith a link find key; whereupon, the selector circuit 12** searches over all associated links for a marking that is applied by the operated line key.

FIGS. 2–7 when joined as shown in FIG. 8 disclose the details of automatic link selector 12. More particularly, the link sleeve or control conductors associated with conductors **21*a*–21*n* (FIG. 1) are shown as cable C51 (FIGS. 5 and 6). The individual keys at the operator position 11 are shown in the most convenient location in the remaining drawings. For example, associated with each subscriber line sleeve conductor, there is a key 402, two of which are shown near the lower left-hand portion of FIG. 4. The common link find key which is used to control the seizure of a busy link is shown as key 404** in the upper portion of FIG. 4. These and other keys will be explained more fully hereinafter.

Turning next to the major component circuits that are shown in selector 12, four select relays 210–240 (FIG. 2) are utilized to control the operation of select magnets in the cross-bar switches 13 and 14. In FIG. 3, there are shown four busy relays 310–340 which prevent the seizure of a busy link and drive the allotter when all links in a group are busy. Allotter group relays 520, 530, 610, 620, 630 and 640 comprise an endless chain of relays which provide for connecting the individual link sleeve to the common control conductors CC51 and thus to select relays 210–240 and busy relays 310–340. If the endless chain of allotter group relays fails to function properly, relays 550, 560 and 570 cause the allotter to reverse direction, thus avoiding the faulty relay.

The detailed drawings illustrate a test counter 365 which may be provided in the form of an electromagnetic counter, such as those shown in U.S. Patent Nos. 2,538,817, 2,538,818 and 2,538,819, granted on January 23, 1951 to John I. Bellamy and assigned to the assignee of this invention. The magnetic counter is provided with a bank of contacts numbered 1–10 which are normally open. When the counter is standing in a released or unoperated condition the contact marked "1" is prepared so that current in the lower or "*step*" winding generates magnetic flux to move an arm and associated mechanical linkage (not shown) to close contacts "1" and prepare contacts "2." Residual magnetism then holds such arm in its operated position. In a similar manner each ensuing energization of the lower or "*step*" winding operates contacts that were prepared by a previous energization pulse and prepares contacts to be operated by a following pulse. After the counter's function is completed, current in the upper or "*release*" winding removes the residual magnetism and all contacts are released.

The purpose and operation of the remaining components and circuitry will become apparent as this description proceeds.

*Detailed description*

Figures 1, 8:
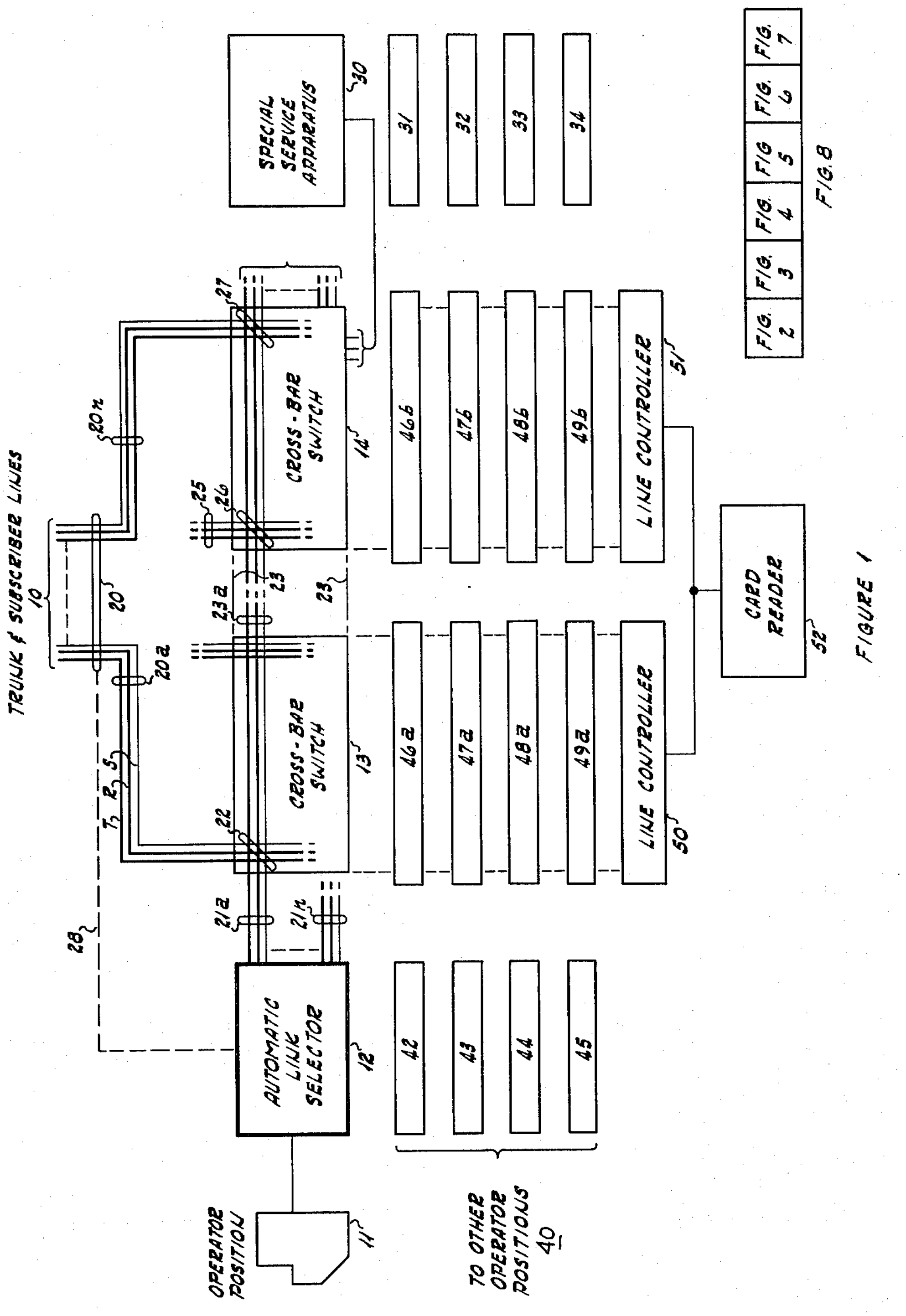

Next, a typical call will be described to explain how the various components interact.

*Seizure.*—To select an idle link, the operator operates link release key 301 (FIG. 3) thereby completing a circuit which may be traced from ground through contacts 301, diode D31, and the winding of link release relay 350 to battery. Also responsive to the operation of link release key 301 and during the operate time of relay 350, a circuit may be traced from ground through key 301, contacts 352, and the upper or "*release*" winding of test counter 365 to battery. Counter 365 is released when so energized.

Responsive to the operation of link release relay 350, contacts 351 and 353–356 open to release any of the busy relays 310–340 which may then be operated. Contacts 352 open to break the release circuit through the upper winding of test counter 365. Contacts 357 open to release any select relays 210–240 which may be operated. Contacts 358 and 359*a* close to prepare a locking path for link release relay 350. Contacts 359*b* close to complete an obvious circuit to operate helping link release relay 750. Contacts 359*c* have no effect at this time. Contacts 359*d* open to release a link which was connected to the operator position.

It is assumed for the purposes of this description that none of the endless chain of allotter group relays 520, 530, 610, 620, 630, and 640 have been operated previously; therefore, when helping link release relay 750 operates, a circuit is prepared for the first of the allotter group relay 520. In greater detail, contacts 751 open and 752 close without immediate effect because it is assumed that none of the allotter relays are now operated. Helping link release relay 750 is locked in an operated condition over a circuit which may be traced from battery through the winding of relay 750, contacts 753, diode D72, contacts 723, 713, 435, and 421 to ground. Contacts 755 open and 754 close, thereby completing a circuit for operating advance check relay 550 after its slow operate time has elapsed, the circuit being traced from battery through the winding of relay 550, contacts 754, 723, 713, 435, and 421 to ground. It should be noted that advance check relay 550 operates only when there is a fault condition in the allotter. Since none of the allotter relays are operated when the circuit is first energized, it appears as a fault condition and advance check relay 550 does operate. A circuit for operating one of the allotter relays is prepared at contacts 756.

Responsive to the operation of advance check relay 550, contacts 551 close, thus applying ground through diode D51, contacts 562 and the upper winding of flip-flop relay 570 to battery. Also responsive to the operation of advance check relay 550, a circuit is completed for operating the first allotter relay 520 as follows: battery, the upper winding of relay 520, contacts 716, 726, 552, and 756 to ground.

Responsive to the operation of flip-flop relay 570, contacts 571 close to operate reverse relay 510. Contacts 572 apply ground to the left-hand terminal of the upper winding of flip-flop relay 560; however, it does not operate at this time since the right-hand terminal of its upper winding is also connected to ground through contacts 562, diode D51, and contacts 551. Contacts 573 close without effect at this time.

It should be noted that, check relay 450 is designed to operate responsive to the operation of any one of the allotter relays and to release if more than one allotter relay is energized at any given time. For example, the first allotter relay 520 has just operated. Therefore, a circuit is now completed to operate check relay 450, as follows: battery extended through the winding of check relay 450 and contacts 642, 633, 623, 613, 533, and 522 to ground. If any other allotter relay should be operated at this time, one of the contacts in the circuit just traced would be opened and check relay 450 either would not operate or would release, if already operated. If check relay 450 is not operated, contacts 451 are not closed and ground from contacts 423 is removed to release the allotter.

Figure 5:
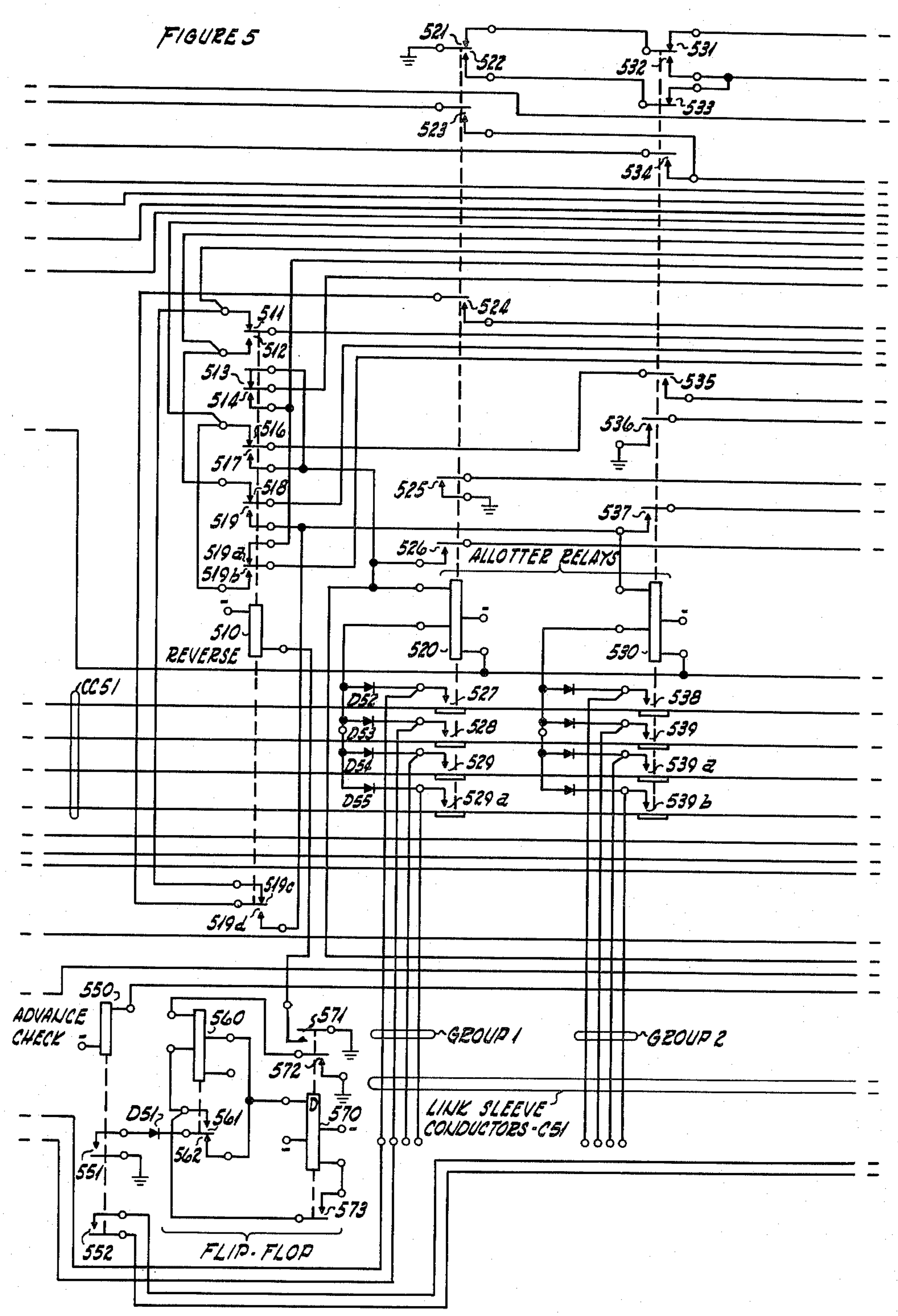

To interconnect the individual link sleeve conductors of group 1 (FIG. 5) and the common control conductors CC51, contacts 527–529*a* are closed by relay 520 when it operates. Also responsive to the operation of allotter relay 520, contacts 523 close to prepare for the operation of a particular select magnet in one of the cross-bar switches 13, 14 associated with the automatic link selector 12, see FIG. 1. Contacts 524 close to prepare a circuit for the next allotter relay. Contacts 525 close to operate the lock even relay 710 over an obvious circuit. Allotter relay 520 locks over a circuit which may be traced from battery through the upper winding of relay 520, contacts 526, 722, 451, and 523 to ground.

To assure operation of the endless chain of allotter relays in a preselected order, relays 710–740 are selectively operated in a proper sequence. More particularly, lock even relay 710 operates when "odd" relay 520 closes contacts 525, as explained above. Contacts 712 open to release any "even" allotter relay (530, 620 or 640) which is then operated. The "odd" relays (520, 610, and 630) lock through normal contacts 722 on the lock odd relay 720. Also responsive to the operation of relay 710, contacts 711 close to prepare a circuit for sequence even relay 730. Contacts 713 open to break the locking circuit for helping link release relay 750. This locking circuit provides an interlock feature so that if the operator should restore the link release key 301 too quickly, it would not be possible for helping link release relay 750 to restore before the operation of lock even relay 710. Contacts 714 open and 715 close without effect at this time. Contacts 716 open the circuit over which relay 520 originally operated; however, there is no effect because this relay has already locked at its contacts 526.

At some time, the operator will restore the link release key 301 and, in turn, the link release relay 350. Responsive thereto, contacts 351 and 353–356 close, thus operating busy or select relays in accordance with busy markings applied over the individual link sleeve conductors of group 1 to the common control conductors CC51, as explained below in greater detail. Contacts 352 close, however, since contacts 301 are now open, there is no effect. Contacts 358 and 359*a* open to break a locking circuit for link release relay 350. Contacts 359 close, thereby preparing a circuit for operating time out relay 370 if the selector does not function properly. In this connection, it should be noted, that prior to the closure of contacts 359 (just described), capacitor C31 was charged over a circuit which may be traced from ground through the lower winding of relay 370, capacitor C31, contacts 373, and the upper winding of relay 370 to battery. Since relay 370 is differentially wound, it does not operate responsive to charging current flowing over this circuit. When contacts 359 first close, the upper winding of relay 370 is energized from ground at contacts 219*a* and capacitor C31 begins to discharge through the lower winding; relay 370 is differentially energized, and there is no effect. If ground is not removed by a timely operation of one of the contacts 219*a*, 229*a*, 239*a*, or 249*a*, time out relay 370 will operate after a period of time measured by the discharging characteristics of capacitor C31, i.e., when capacitor C31 is discharged and the lower winding of relay 370 is no longer energized.

Returning to the restoration of link release relay 350, contacts 359*b* open thereby breaking an obvious circuit to helping link release relay 750. If the lock even relay 710 has already operated to open contacts 713, relay 750 releases at this time. Responsive to the release of relay 750, contacts 751 close and sequence even relay 730 operates over a circuit which may be traced from battery through the winding of relay 730, contacts 742, 711, 751, 451, and 423 to ground. Relay 730 operates to assure the operation of the next allotter relay in a proper sequence. Also responsive to the release of relay 350, contacts 359*c* and 359*d* close to prepare for operating a cross-point in the cross-bar switches associated with an idle link sleeve lead.

*Busy test.*—The four individual link sleeve conductors in group 1 are now connected from the common busy bus 401, over common conductor CC51 to the windings of busy relays 310–340 and select relays 210–240 via contacts 527–529*a*. It is assumed that the first link sleeve conductor is marked with a busy ground. Therefore, a circuit may now be traced from ground on contacts 412 over common busy bus 401 through contacts 403*a* (which may be located at an operated cross-point) contacts 529*a*, 356, the winding of busy relay 340, contacts 351, 434 and the filament of ballast lamp L42 to battery. Busy relay 340 operates and closes contacts 341; however, there is no effect because it is assumed that there is an idle link sleeve conductor among group 1, i.e., not all of the busy relays 310–340 will operate and at least one of the contacts 311, 321, 331 or 341 will remain open. The busy ground that is applied to relay 340 also shunts select relay 210 to inhibit the operation thereof (the operate circuit that would otherwise be effective extends from battery through ballast lamp L41, contacts 437, 357, diode D35, contacts 249, 239, 229 and the winding of relay 210 to ground). Contacts 342 close an interlock circuit to relay 350. Contacts 343 open a circuit from ground at contacts **219*b* to time out relay 370. If any other link sleeve conductor is marked busy at closed cross-point switches 403, corresponding relays among the group of busy relays 310–340** operate.

*Idle link*.—It is assumed that the second link in group 1 is idle at this time. Therefore, no cross-point is operated to close contacts **403*b* and the second link sleeve conductor has no busy marking ground potential applied thereto. No shunting ground appears to inhibit the operation of select relay 220 which, therefore, operates over a circuit extending from ground on contacts 219 through the winding of relay 220, contacts 238, 248, diode D33, contacts 357, 437 and the filament of ballast lamp L41** to battery.

Responsive to the operation of select relay 220, contacts **229*b* close, thereby operating position controller relay 391 and line controller relay 392 over a circuit which may be traced from battery extended through the windings of these two relays, off-normal contacts ONI, contacts 359*c*, and contacts 229*b* to ground. Contacts 229*a* open to break the circuit extending from ground through contacts 219*a*, 229*a*, 239*a*, 249*a*, 259, and 264 to time out relay 370. Therefore, if it is assumed that capacitor C31 has not yet fully discharged, differentially energized time out relay 370 is de-energized when contacts 229*a* open. Contacts 229 open to prevent operation of select relay 210 if the associated link sleeve conductor should suddenly become idle. Contacts 227 and 228 open to prevent operation of relays 230 and 240 if the associated link sleeve conductors have busy ground markings removed therefrom or to release relays 230 and 240 if they have already operated. Contacts 221–226** close to prepare for the operation of a select magnet in an associated cross-bar switch.

*Time out*.—If a select relay does not operate to open one of the contacts **219*a*, 229*a*, 239*a* or 249*a*, differential relay 370 operates when the discharging current ceases to flow through its lower winding. Responsive thereto contacts 371 close to operate link release relay 350 with the above described results, contacts 373 close to transmit an alarm, if required, and contacts 372 close to complete an obvious circuit for charging capacitor C31. As soon as link release relay 350 operates contacts 359 open to de-energize the upper winding of relay 370; however, relay 370 continues to be held by current flowing in its lower winding for a period of time required for capacitor C31 to charge. Thereafter, relay 370 releases, contacts 371 open to release relay 350, and contacts 372 open the break the circuit over which capacitor C31** charged.

Figure 6:
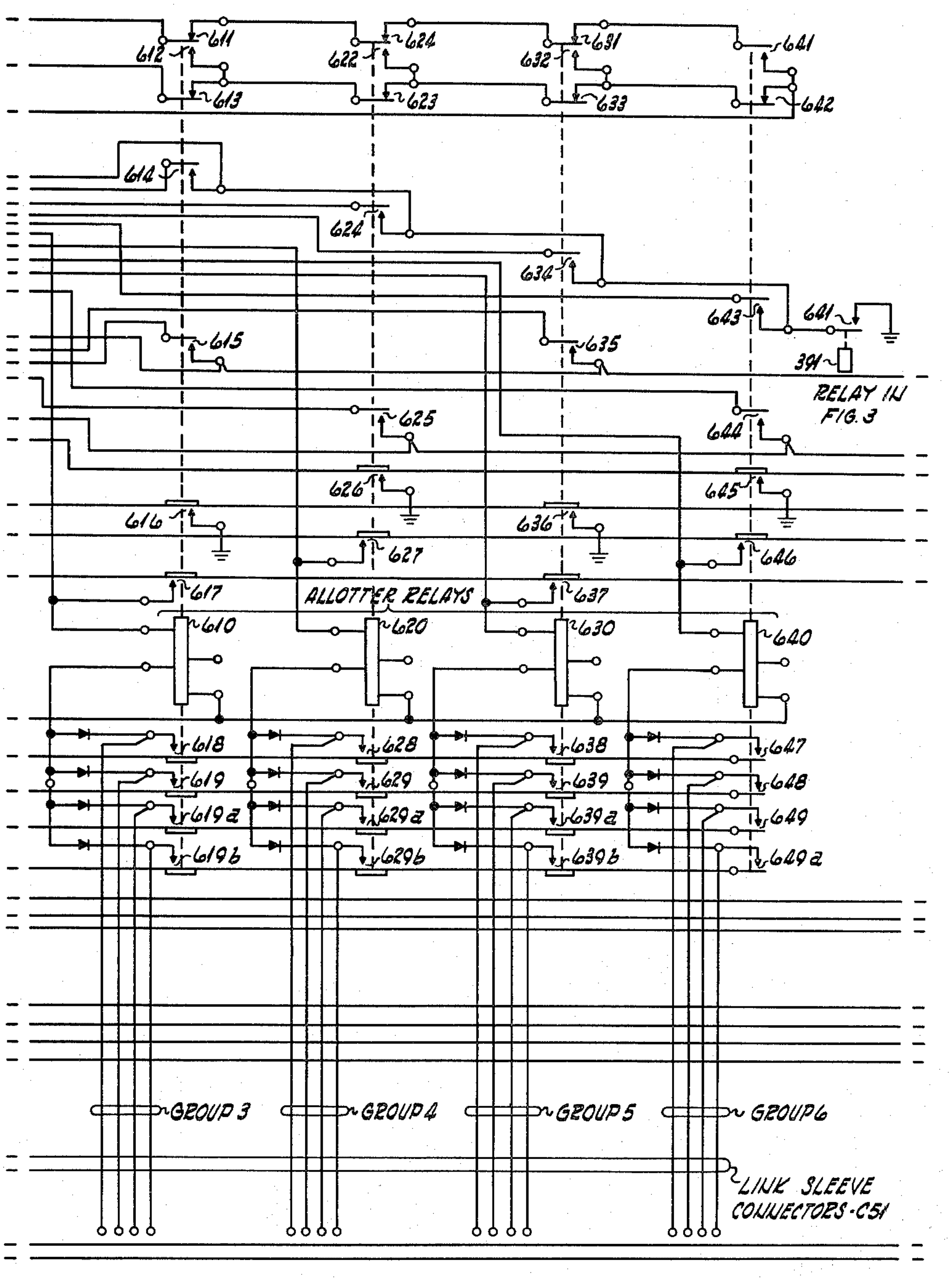
Figure 7:
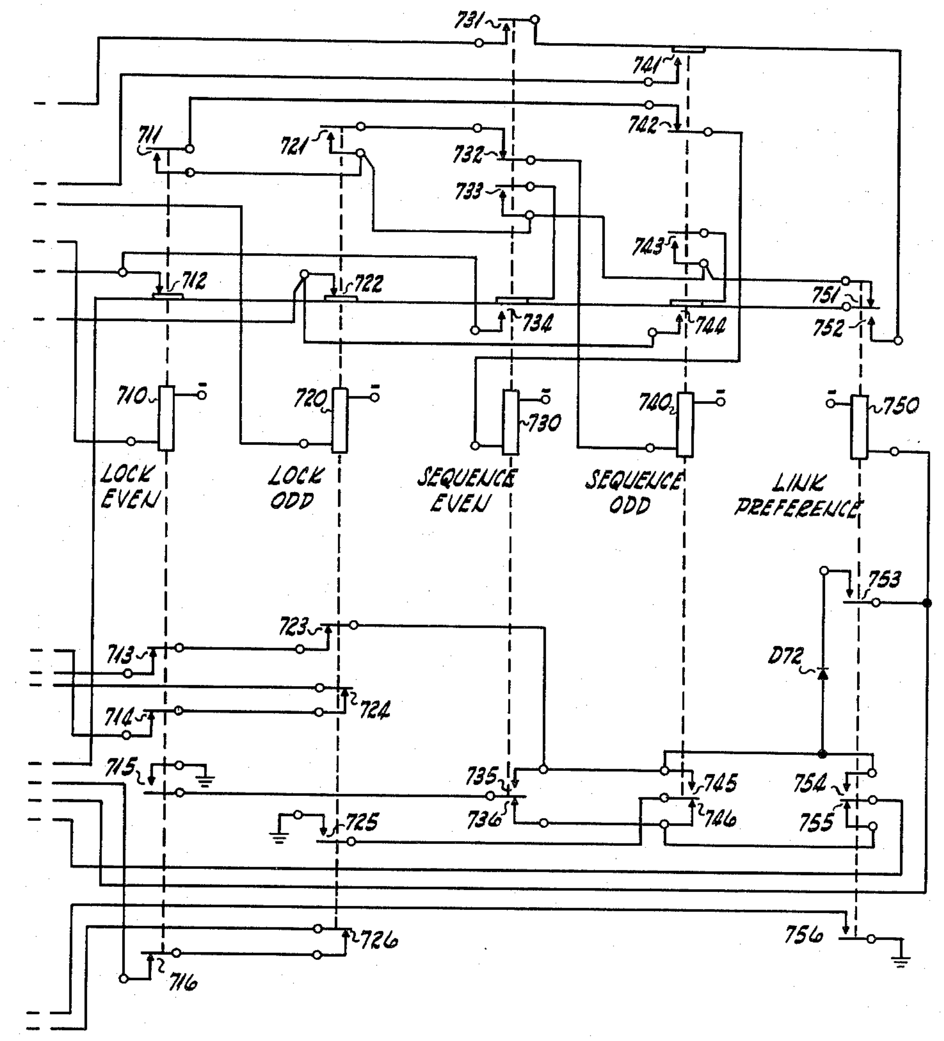

*Operation of cross-point*.—To control the operation of a selected cross-point, position controller relay 391 operates as described above. Contacts 641 close to control a select magnet, and contacts 393 open to prevent a premature operation of a hold magnet. Referring to contacts 641 as they are shown in the upper right-hand portion of FIG. 6, a circuit is closed when relay 391 operates to energize a particular select magnet in one of the cross-bar switches 13, 14 (FIG. 1) depending upon which of the allotter relays is operated and which of the select relays is operated. Since it has been assumed that relays 520 and 220 are now operated, the circuit for controlling the select magnet is as follows: ground, contacts 641, 523, 221 and conductor **21*m*** to a circuit which controls the operation of a particular select magnet.

When the select magnet controlled over conductor **21*m* operates, associated off-normal contacts ONI (FIG. 3) open, thereby breaking a circuit to position controller relay 391 and line controller relay 392. Relay 391 releases immediately but relay 392 is held briefly by its own slow release characteristics. During the time interval while relay 392 remains operated, a circuit may be traced from ground through contacts 393 and 394 to operate a hold magnet in one of the cross-bar switches 13, 14, thus maintaining the selected cross-point in an operated condition. Thereafter, line controller relay 392 releases and opens contacts 294; however, the hold magnet has already locked over a path which may be traced from the operator hold conductor through contacts 359*d* and 438** to battery.

After select and hold magnets have operated in the described manner, the operator position is connected through a cross-point such as point 22 (FIG. 1). The operator may now talk to the calling subscriber and perform any requested services.

*All links in a group are busy*.—This description has proceeded to this point on the basis that at least one link among the first group of links to be tested is in an idle condition at the time of testing. It will now be assumed that all links in such group are busy when tested. Therefore, it is necessary for the endless chain of allotter relays to step-on and test a second group of links to determine whether an idle one is available. It may be well to recall at this time that a link is marked busy when ground potential is applied through operated cross-point contacts 403, the circuit being traced from ground on contacts 412 over a common busy bus 401, contacts such as **403*a*, and a link sleeve conductor, for example. Therefore, all of the busy relays 310–340 operate when link release relay 350 restores to close contacts 351 and 353–356** as explained above.

*Allotter operation* (*non-faulty*).—A drive pulse is transmitted to step the endless chain of allotter relays when all of the busy relays 310–340 operate at the same time. More particularly, when all busy relays operate simultaneously, a chain circuit is completed which may be traced as follows: ground extended through contacts **219*a*, 229*a*, 239*a*, 249*a*, 311, 321, 331, 341, and 362 where the circuit divides into two parallel paths one of which extends through the lower or step winding of test counter 365 to battery and the other of which extends through diode D32 and the winding of link release relay 350 to battery. Diode D31 prevents this ground marking from energizing the upper or release winding of counter 365. Counter 365** operates over its lower winding and closes its contacts 1 to record the occurrence of an all busy group. Since contact 1 is not marked, there is no immediate effect.

Responsive to the operation of link release relay 350, contacts 351, and 352–356 open to release the busy relays 310–340. Contacts 352, 357, and **359*a* have no effect at this time. Contacts 358 close to complete a locking path extending from battery through the winding of link release relay 350 to ground via parallel contacts 312, 322, 332, and 342; therefore, link release relay 350 cannot restore before the complete restoration of all of the busy relays 310–340. Contacts 359 open to break one point in the circuit to time out relay 370, thereby resetting it by allowing capacitor C31 to recharge over a circuit including the two windings of relay 370 connected in series. Relay 370 does not operate since it is differentially energized while capacitor C31 recharges. Contacts 359*b* close to generate a pulse for driving the allotter as will be explained below, while contacts 359*d*** open to release any operator hold magnets which may be operated at this time.

Turning next to the operation of the endless chain of allotter relays as they respond to the drive pulse generated by link release relay 350 at contacts **359*b*, ground is extended over an obvious circuit through the winding of helping link release relay 750 to battery. Responsive thereto, relay 750 operates and contacts 751 open to break the circuit over which sequence even relay 730** operated; however, it does not restore because it is locked over the circuit extending from battery through the winding of relay 730, contacts 742, 711, 733, 734, 451, and 423 to ground. Contacts 753 close and relay 750 locks over a circuit extending from battery through the winding of relay 750, contacts 753, 735, and 715 to ground. Contacts 756 have no effect at this time.

The allotter is stepped in either of two orders when contacts 752 close. For example, with reverse relay 510 unoperated and allotter relay 520 operated, a circuit is completed as follows: battery, the upper winding of relay 530, contacts 519*d* (relay 510 being unoperated), contacts 524 (relay 520 being operated), contacts 731, 752, 451 and 423 to ground; hence, relay 530 operates. If it were assumed that reverse relay 510 is operated at this time, the allotter stepping circuit would have been completed from battery through the upper winding of relay 640, contacts 519*c*, 524, 731, 752, 451, and 423 to ground. Hence, it is seen that the allotter may be stepped in either a first direction or a second direction depending upon whether reverse relay 510 is operated or unoperated. For example, with reverse relay 510 unoperated, the allotter steps in a first order wherein the endless chain of relays operate in the sequence 520, 530, 610, 620, 630, 640, 520, etc. Conversely, when relay 510 is operated the sequence is 640, 630, 620, 610, 530, 520, 640 etc.

Turning next to the operation of allotter group relay 530, contacts 532 close while contacts 531 and 533 open, thereby completing a circuit for holding check relay 450 in an operated condition if no other allotter group relay is operated, the circuit being traced from battery through the winding of relay 450, contacts 642, 633, 623, 613, 532 and 521 to ground. If it were assumed that relay 520 fails to release properly (as described below), contacts 533 would open the circuit over which check relay 450 previously operated and contacts 521 would fail to close and complete the present circuit. On the other hand, if it were assumed that relay 520 released properly and relay 530 failed to operate the circuit to check relay 450 would be open at contacts 641.

Figure 2:
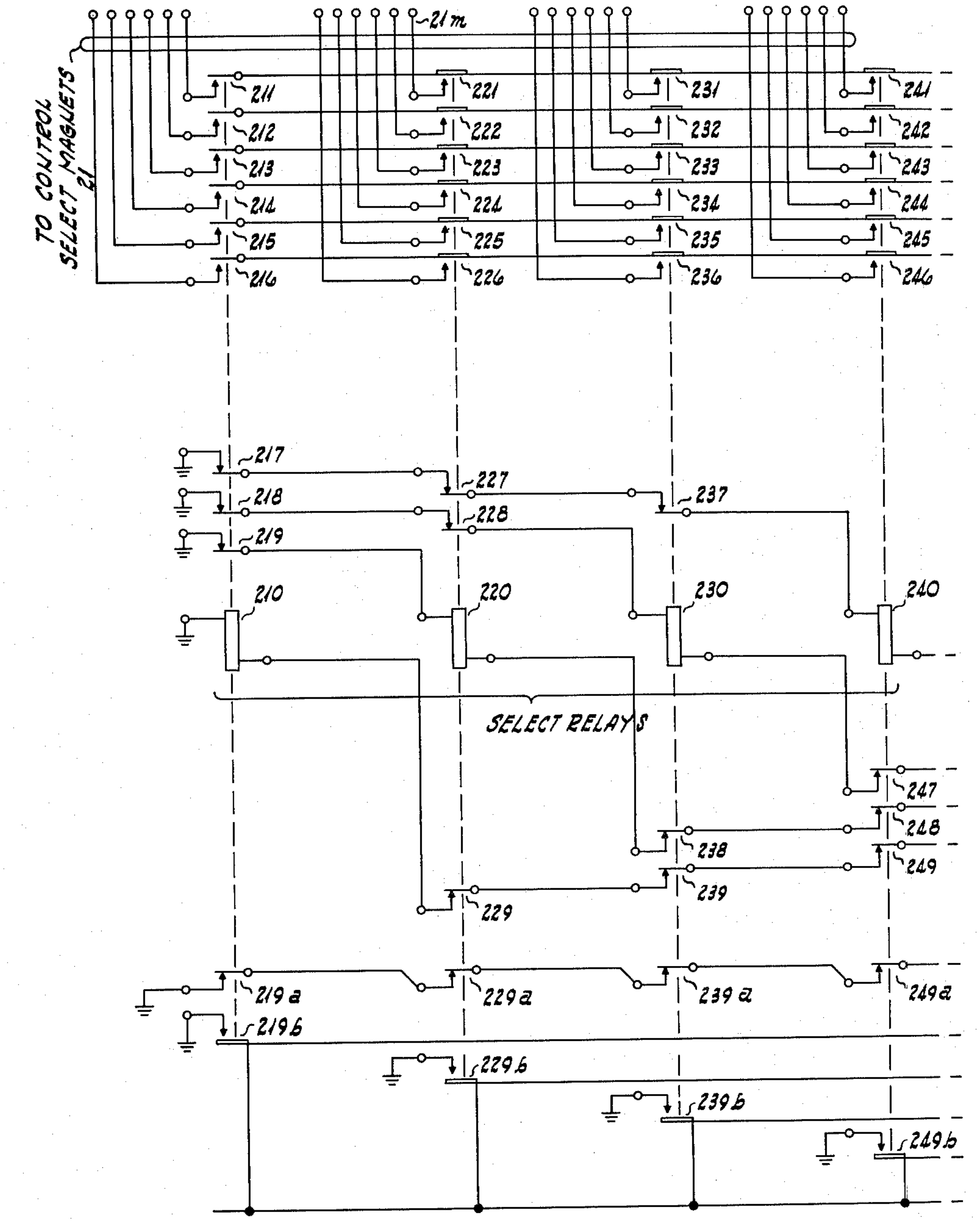

Returning to the operation of relay 530, contacts 535 close to prepare for a later operation of the next allotter group relay 610. Contacts 536 close thereby operating lock odd relay 720 over an obvious circuit. Contacts 537 close to prepare a locking circuit for relay 530. Contacts 538–539*b* close to connect group 2 of the individual link sleeve conductors to the common control conductors CC51 and therefore to the busy and select relays of FIGS. 3 and 2 respectively.

Responsive to the operation of lock odd relay 720, contacts 721 close, thereby preparing a circuit for operating sequence odd relay 740. Contacts 722 open thus releasing allotter relay 520 which had been holding through its contacts 526 to ground extended through contacts 722, 451 and 423. Contacts 723 and 724 open without effect at this time. Contacts 725 close to extend ground through contacts 746, 755, and the winding of advance check relay 550 to battery; however, since a non-faulty operation is assumed at this time, this circuit will open before slow operate relay 550 can pick-up.

Responsive to the release of allotter relay 520, contacts 525 open thereby restoring lock even relay 710. Thereafter, contacts 711 open to break the holding circuit for sequence even relay 730.

When sequence even relay 730 restores, contacts 731 open to break the circuit over which relay 530 just operated. Contacts 732 close to prepare a circuit for sequence odd relay 740, contacts 733 and 734 open the locking circuit which formerly held relay 730, contacts 735 open to break one circuit to advance check relay 550; however, it continues to be energized over a circuit including contacts 725, 745, and 754. The slow operate time of relay 550 has not yet expired and it remains unoperated.

The drive pulse which was extended to step the allotter relays is terminated after all of the busy relays 310–340 release to open each of the parallel contacts 312, 322, 332, and 342, the busy relays having released when allotter relay 520 fell to open contacts 527–529*a*. Therefore, link release relay 350 which was locked to the parallel contacts through contacts 358 restores. Responsive thereto, contacts 359*b* open to release helping link release relay 750 and contacts 359*c* and 359*d* close to prepare for connecting the operator to one of the links associated with group 2 sleeve conductors, if idle.

Responsive to the release of helping link release relay 750, contacts 751 close, thereby completing a circuit to operate relay 740, the circuit being traced from ground on contacts 423 through contacts 451, 751, 721, 732, and the winding of sequence odd relay 740 to battery. Contacts 754 open to break one circuit and contacts 755 close to complete another circuit to advance check relay 550 which has not yet operated owing to its slow operate characteristics.

Responsive to the operation of sequence odd relay 740, contacts 741 close; however, there is no effect at this time since contacts 752 are now standing open. Contacts 742 open a point in the circuit for sequence even relay 730; however, it has already released and there is no immediate effect. Contacts 743 close a locking circuit which may be traced from battery through the winding of sequence odd relay 740, contacts 732, 721, 743, 451 and 423 to ground while contacts 744 close to prepare for the next allotter relay operation. Contacts 745 close without effect at this time. Contacts 746 open thereby breaking the final circuit to advance check relay 550 which has not yet had time enough to operate.

The next group of links is tested to determine whether an idle link is available. Since the second allotter relay 530 is now operated, the individual link sleeve conductors in group 2 are connected through contacts 538–539*b* to common or control conductors CC51 and, hence, to the busy and select relays of FIGS. 3 and 2. If any link is busy, a circuit may be traced as explained above for operating a busy relay and inhibiting a select relay. On the other hand, if there should be an idle link, a select relay is operated from battery extended through the filament of lamp L41.

Assuming that no links in group 2 are idle, link release relay 350 is operated by the busy relays 310–340 and the allotter is driven to connect the group 3 sleeve conductors to the busy and select relays. In a similar manner, the allotter is driven step-by-step responsive to each testing of an all busy group of links.

Figure 3:
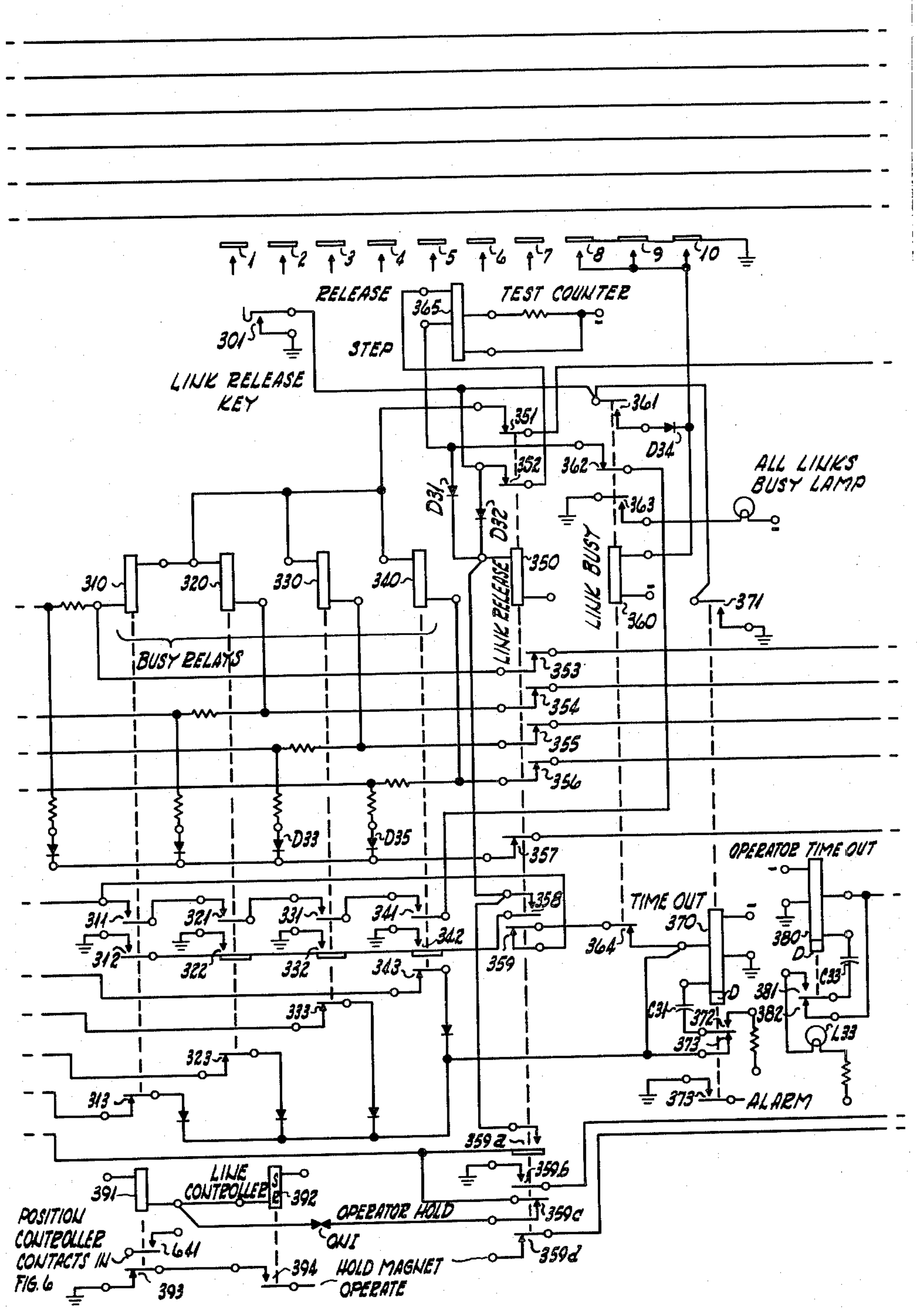

For establishing a limit to the number of times that an all links busy signal may be encountered, each time that all of the busy relays operate, test counter 365 is advanced one step, as described above. The sequence in which the counter's contacts close are from left to right as shown in FIG. 3; therefore, on the first step, contacts 1 close but there is no effect because they are not marked. In a like manner, each of the contacts 2–7 closes in its turn without effect. It will be noted that there are six groups of link sleeve conductors; therefore, when the test counter has taken eight steps, 133⅓% of the links available have been tested. If no idle link is found before the eighth counter step, a circuit may be traced from ground through counter contacts 8 to the winding of all links busy relay 360 to battery, thus causing it to operate. Contacts 362 open so that no further control may be extended from the chain circuit including contacts 311, 321, 331 and 341 to the winding of link release relay 350; therefore, it cannot reoperate and the allotter does not take another step. Contacts 363 close to light all links busy lamp L31 and contacts 364 open to prevent the operation of time out relay 370.

Nothing further happens until the operator notes the lit condition of lamp L31 and takes appropriate action.

*Faulty allotter relay operation*

Means are provided for reversing the direction in which the allotter searches responsive to an occurrence of a fault condition at any of the allotter relays either because an allotter relay releases improperly or because an allotter relay does not release in its turn. Normally, the allotter relays operate in a first order, i.e., 520, 640, 630, 620, 610, 530, 520, 640 etc. If, for example, relay 530 is faulty, the allotter relays will operate in the following order: 520, 640, 630, 620, 610, 620, 630, 640, 520, 640 etc. Hence, a faulty relay does not tie up the entire allotter operation but allows all non-faulty relays to operate in a reversing sequence.

*Relay flip-flop.*—To control the order in which the endless chain of allotter relays operate, a bi-stable circuit is provided in the form of all-relay flip-flop circuit 560, 570. In greater detail, the bi-stable or flip-flop circuit is operated under the control of drive pulses which are generated by relay 550 at its contacts 551. Responsive to the operation of contacts 551 a circuit is completed which may be traced from ground at contacts 551 through diode D51, contacts 562, and the upper winding of differential relay 570 to battery. Relay 570 operates and closes contacts 572, thereby completing a circuit through the upper winding of relay 560 which, however, does not operate at this time since a shunting ground is applied through contacts 551 and 562 to the right-hand terminal of the upper winding. When advance check relay 550 restores, it opens contacts 551 thereby removing the shunt from around the upper winding of relay 560. Relay 560 now operates over a circuit which may be traced from ground through contacts 572 and the upper windings of relays 560 and 570 to battery. Responsive to the operation of relay 560, contacts 561 close; however, there is no immediate effect because advance check relay 550 has restored to open contacts 551. The flip-flop is now in a first stable state.

The next time that advance check relay 550 operates, contacts 551 close, thereby completing a circuit via contacts 561 through the lower windings of relays 560 and 570 in parallel to battery. Current flow in the lower winding of relay 570 differentially energizes it and causes it to release thereby opening contacts 572. Relay 560 continues to hold over its own lower winding and locking contacts 561 until advance check relay 550 restores. Responsive thereto, contacts 551 open and relay 560 drops. The flip-flop circuit is now in its second stable state.

Hence, it is seen that relays 560 and 570 comprise an all-relay, bi-stable circuit which provides a two-step cycle of operation under the influence of drive pulses emanating from contacts 551. In this particular application, the two-step cycle is utilized to control the order in which the endless chain of allotter relays operate.

*Reversing allotter.*—Next, let it be assumed that allotter relay 520 is operated, that reverse relay 510 is un-operated, and that allotter relay 530 fails to operate when helping link release relay 750 operates. Just prior to the operation of relay 750, relays 520, 710 and 730 are also operated. Therefore, when relay 750 operates, contacts 752 close to complete a circuit to allotter relay 530, as follows: battery, the upper winding of relay 530, contacts 519*d*, 524, 731, 752, 451, and 423 to ground. However, it is assumed that relay 530 fails to operate.

Under normal conditions, lock even relay 710 falls before slow operate advance check relay 550 has time to operate. Under the assumed abnormal conditions, relay 530 does not come up, contacts 536 remain open, lock odd relay 720 does not open contacts 722 to which relay 520 is locked, and lock even relay 710 continues to be held from contacts 525. Therefore, after its slow operate period has expired, advance check relay 550 operates over the circuit which may be traced from battery through the winding of relay 550, contacts 754, 735, and 715 to ground. Hence, it should be noted that relay 550 operates only in response to an abnormal condition.

To drive the bi-stable or flip-flop circuit, the advance check relay 550 closes contacts 551 and relay 570 operates. When relay 570 operates, contacts 571 close to operate reverse relay 510. Responsive to the operation of reverse relay 510, contacts 519*d* open to disconnect the upper winding of allotter relay 530 and contacts 519*c* close to connect the upper winding of allotter relay 640 over a circuit which may be traced from battery through the upper winding of relay 640, contacts 519*c*, 524, 731, 752, 451, and 423 to ground. Hence, it is seen that operation of flip-flop relay 570 has operated reverse relay 510 to reverse the order in which the endless chain of allotter relays operate, i.e., before relay 510 operates, relay 530 follows relay 520 in the operation sequence and after relay 510 operates, relay 640 follows relay 520.

If the remaining contacts on relay 510 are examined, it will be found that the remaining allotter relays are also connected to operate in either of two orders in accordance with the operated or unoperated condition of relay 510. More specifically, contacts 519*a* open and 514 close to transfer the operating circuit for allotter relay 630 from a first sequence to a reversed sequence. In a similar manner, contacts 518 open and 512 close to transfer the operating circuit for relay 620; contacts 516 open and 519*b* close to transfer the operating circuit for relay 610; and contacts 513 open and 517 close to transfer the operating circuit of relay 520.

Each time that helping link release relay 750 operates after reverse relay 510 has operated, the endless chain of allotter relays is advanced in the order of relay 640, 630, 620, and 610. After relay 610 has operated, the next operation of helping link relay 750 should signal the operation of relay 530 over a circuit which may be traced from battery through the upper winding of relay 530, contacts 519, 615, 731, 752, 451 and 423 to ground. However, relay 530 does not operate since it is assumed to be faulty. Again, lock odd relay 720 does not operate and lock even relay 710 remains operated because contacts 536 do not close. After the slow operating time of advance check relay 550 has expired, it operates over a circuit via contacts 754, 735, and 715 to ground. Advance check relay 550 closes contacts 551 thereby energizing the lower windings of flip-flop relays 560 and 570 via contacts 561 to switch the bi-stable circuit to its second stable state. Relay 570 releases since it is now differentially energized. Contacts 571 open and reverse relay 510 restores whereupon the sequence of allotter relay operation is again reversed. Hence, relay 620 operates over the circuit which may be traced from battery through its upper winding, contacts 518, 615, 731, 752, 451 and 423 to ground. Therefore, it is seen that the order in which the endless chain of allotter relays operate is reversed each time that a faulty relay is encountered, thus preventing a failure of the entire allotter circuit if one or more of the relays operate improperly.

*Selection of a busy link*

Means are provided for seizing and operating a busy link responsive to a simultaneous operation of a common link find key and an individual line key. To fully appreciate this feature, it may be well to recall that a call comes in and the operator presses link release key 301, thereby causing the various groups of link sleeve conductors to be sequentially connected to control the operation of the select relays in FIG. 2 or the busy relays in FIG. 3 depending upon the presence or absence of ground potential on the individual sleeve conductors. If an idle link is found, a connection is completed through conductors 21 to control a selected cross-point. After the operator has performed all necessary services, she disconnects by again operating link release key 301. Although the subscriber lines that are served by the link remain connected, the operator position is disconnected. Later, it may be necessary for the operator to reconnect with the busy line, as for example, to add subscriber lines during a conference call or to provide service when a subscriber flashes hook switch contacts.

Figure 4:
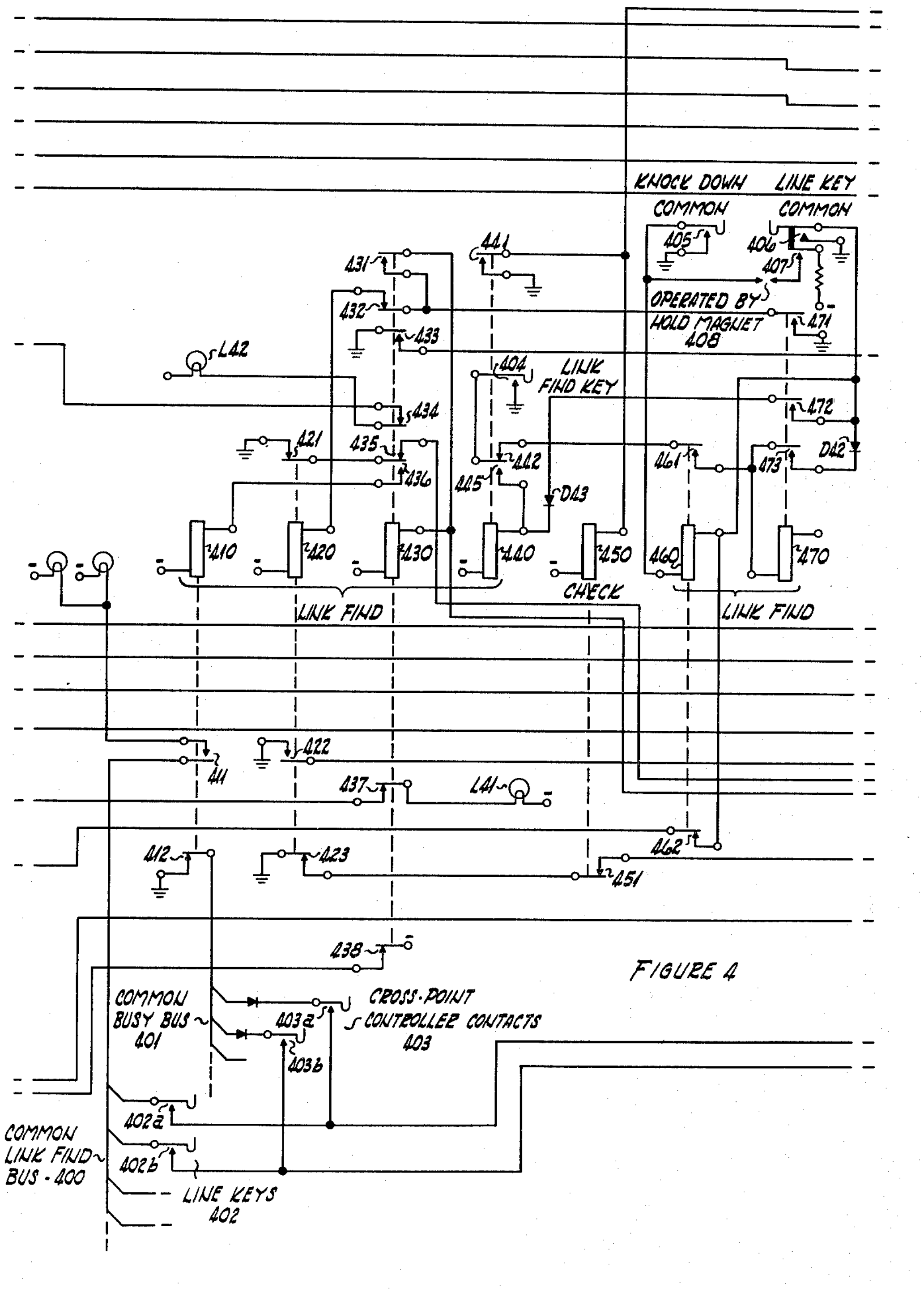

To return to the busy link, the operator simultaneously presses a common link find key 404 (upper center of FIG. 4), and an individual line key 402 (lower left-hand corner of FIG. 4) which is associated with the desired scriber line. Multipled on each line key, there are contacts which make connection with common busses, the contacts being shown at 406 and 407 in the upper right-hand portion of FIG. 4. Ground on contacts 406 is connected to the windings of relay 380 via contacts 462; however, relay 380 does not operate at once because it is differentially energized by current flowing in its lower winding while capacitor C33 discharges to ground on contacts 406.

It is assumed that the operator is connecting into a busy link; therefore, a hold magnet is operated at such busy link and off-normal contacts 408 are closed. When a line key is pressed, the common contacts 406, 407 close so that link find relay 460 operates over the circuit traced from resistance battery through contacts 407, operated off-normal contacts 408, the winding of relay 460, and contacts 406 to ground. Responsive to the operation of relay 460, contacts 461 close and link find relay 470 operates over a circuit which may be traced from battery through the winding of relay 470, contacts 461, 442, and common link find key 404 to ground. Contacts 462 open to break the circuit to the operator time out relay 380 and capacitor C33 recharges over the two windings of relay 380, connected in series, relay 380 being differentially energized thereby, i.e., in an unoperated condition. Thus, if there is a normal condition relay 380 does not operate. However, if relay 460 does not open contacts 462 soon enough after contacts 406 close, capacitor C33 discharges, current no longer flows in the lower winding of time out relay 380 which operates over its upper winding to close contacts 381 and light lamp L33.

Responsive to the operation of link find relay 470, contacts 473 close, thereby locking over a circuit through diode D42 to ground at contacts 406. Contacts 471 close to operate relay 420 over a circuit including contacts 432 while contacts 472 close to operate relay 440 over a circuit including diode D43.

Responsive to the operation of link find relay 420, contacts 421 open, thereby preventing an operation of helping link release relay 750 via a circuit including contacts 753. Contacts 422 close and ground is extended through contacts 714, 724, to operate relay 430. Contacts 423 open to remove the ground marking which is normally extended through check relay contacts 451 to operate the various allotter relays. The normal operating circuits for the allotter relays are now disabled.

When relay 430 operates, it locks at contacts 431 to ground on contacts 471. Contacts 432 open to restore relay 420, thereby reclosing contacts 422 and 423. Contacts 433 close to prepare circuits for the lower windings of each allotter relay. Contacts 434 open to disable the busy relays 310–340. Contacts 435 open to break one point in a locking circuit associated with helping link release relay 720. Contacts 436 close and operate relay 410 from ground on contacts 421. To disable the normal circuit for operating select relays of FIG. 2, contacts 437 open. Contacts 438 open to release any operator hold magnets which may be operated.

Responsive to the operation of link find relay 440, contacts 441 close an obvious circuit to operate the check relay 450. Contacts 442 open and relay 470 is placed under the complete control of the common contacts 406 on the line keys.

Let it be assumed for the purposes of this description that the operator has operated a line key having contacts **402*b* individual thereto. When relay 410 operates, contacts 412 open to remove busy ground marking from common busy bus 401. Contacts 411 close to place a battery markings on the common link find bus 400. Since contacts 402*b* are closed, battery is extended to the second link sleeve conductor in group 1 and to no other link sleeve conductor in group C51. The allotter relay 520 is now operated via its lower winding, the circuit being traced from battery through ballast lamps, contacts 411, bus 400, contacts 402*b*, diode D54, the lower winding of relay 520 and contacts 433 to ground. When relay 520 operates the individual sleeve conductors of group 1 are extended via common or control conductors CC51 to the select relays of FIG. 2 where relay 220 is operated by the battery marking applied through contacts 402*b*. When the select relay 220** operates, the operator is connected to the busy link.

When the operator restores the link find key and the operated line key, all of the link find relays are released. When relay 430 restores, contacts 438 close to energize the operator hold magnet at the select cross-point.

The operator is now connected to a busy link and may take any appropriate action after which the link release key 301 is operated and the circuit returns to normal.

While we have described the above principles of our invention in connection with specific apparatus, it is to be clearly understood that this description is made only by way of example and not as a limitation on the scope of our invention.

We claim:

1. An allotter for use in a telephone system, said allotter comprising a plurality of individual conductors divided into groups, a plurality of control conductors common to said individual conductors, an endless chain of relays connected for sequential operation responsive to the receipt of drive pulses, each of said relays having contacts for connecting an associated group of the individual conductors to said common control conductors responsive to operation of the associated relay, means comprising a bistable circuit for causing said relays to operate in either of two orders, said bi-stable circuit normally being in a first stable state thereby causing said relays to operate and connect said individual conductors to said control conductors in a first of said orders, and means responsive to the encountering of a fault condition at any one of said relays for operating said bi-stable circuit thereby operating said relays in the other of said orders and connecting said individual conductors to said common conductors in said other order.

2. An allotter for use in a telephone system comprising a plurality of individual conductors divided into groups, a plurality of control conductors common to said individual conductors, an endless chain of relays connected for sequential operation in either of two orders responsive to the receipt of drive pulses, each of said relays having contacts for connecting an associated group of the individual conductors to said control conductors responsive to operation of the associated relay, means for normally causing said relays to operate in a first of said orders thereby connecting said individual conductors to said control conductors in said first order, and means responsive to fault conditions occurring at any one of said relays for operating said relays in the other of said orders thereby connecting said individual conductors to said control conductors in said other order.

3. A switching system for interconnecting a plurality of circuits each having an individually associated conductor for controlling the seizure thereof, a group of conductors common to all of said individually associated conductors, first means connected to said common conductors for detecting signals applied thereto, second means connected to said common conductors for detecting an absence of said signals, means for connecting a group of said individual conductors to said common conductors, each individual conductor in the connected group being electrically associated with corresponding one of said common conductors whereby the signals applied to the individual conductors appear on the corresponding common conductors, means responsive to the detection of said signals on said common conductor by said first means for preventing operation of said switching system, and means responsive to the detection of said absence of said signals for selectively operating said switching system in accordance therewith.

4. A circuit comprising an endless chain of relays, means including a source of driving pulses for sequentially operating said relays in a given order, means responsive to fault conditions at one of said relays for reversing said order of operation, and means for thereafter reversing said order of operation each time that said fault condition is encountered.

5. A circuit comprising an endless chain of relays, means including a source of driving pulses for sequentially operating said relays in a given order, an all relay flip-flop circuit, means responsive to fault conditions at one of said chain relays for operating said flip-flop circuit, means responsive to fault conditions at one of said chain relays for operating said flip-flop circuit, means responsive to operation of said flip-flop circuit for reversing said order in which said chain of relays operate, means for thereafter operating said flip-flop circuit each time that said faulty relay is encountered, and means for reversing said order in which said chain of relays operates each time that said flip-flop circuit operates.

6. The circuit of claim 5 wherein said flip-flop circuit comprises a drive relay, a differential relay having an operating winding and a release winding, means for energizing said operating winding responsive to operation of said drive relay, a two winding relay, means responsive to operation of said differential relay for connecting one of said two windings in series with said operating winding, said one winding being shunted via a circuit operated by said drive relay whereby said two winding relay operates in series with said differential relay when said drive relay releases, and means responsive to the operation of said two winding relay for connecting the other of said two windings and said release winding in series with make contacts on said drive relay.

7. The circuit of claim 1 wherein said bi-stable circuit comprises a drive relay, a differential relay having an operating winding and a release winding, means for energizing said operating winding responsive to operation of said drive relay, a two winding relay, means responsive to operation of said differential relay for connecting one of said two windings in series with said operating winding, said one winding being shunted via a circuit operated by said drive relay whereby said two winding relay operates in series with said differential relay when said drive relay releases, and means responsive to operation of said two winding relay for connecting the other of said two windings and said release winding in series with make contacts on said drive relay.

8. An all relay flip-flop circuit comprising a drive relay, a differential relay having an operating winding and a release winding, means for energizing said operating winding responsive to operation of said drive relay, a two winding relay, means responsive to operation of said differential relay for connecting one of said two windings in series with said operating winding, said one winding being shunted via a circuit operated by said drive relay whereby said two winding relay operates in series with said differential relay when said drive relay releases, and means responsive to operation of said two winding relay for connecting the other of said two windings and said release winding in series with make contacts on said drive relay whereby both said differential relay and said two winding release responsive to the next operation and release of said drive relay.

No references cited.

ROBERT H. ROSE, *Primary Examiner.*